(12) United States Patent
Iyer et al.

(10) Patent No.: US 8,709,560 B2
(45) Date of Patent: Apr. 29, 2014

(54) POLYMERIC COMPOSITIONS INCLUDING THEIR USES AND METHODS OF PRODUCTION

(75) Inventors: Srivatsan Srinivas Iyer, Pearland, TX (US); Thomas Michael Miller, Pensacola Beach, FL (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1104 days.

(21) Appl. No.: 11/663,482

(22) PCT Filed: Sep. 16, 2005

(86) PCT No.: PCT/US2005/033047
§ 371 (c)(1),
(2), (4) Date: Mar. 22, 2007

(87) PCT Pub. No.: WO2006/065300
PCT Pub. Date: Jun. 22, 2006

(65) Prior Publication Data
US 2009/0197029 A1    Aug. 6, 2009

Related U.S. Application Data

(60) Provisional application No. 60/636,500, filed on Dec. 16, 2004.

(51) Int. Cl.
*C08L 47/00* (2006.01)
*C08L 33/02* (2006.01)
*B32B 9/00* (2006.01)

(52) U.S. Cl.
USPC ............... 428/35.7; 428/318.4; 428/319.3; 428/319.7; 428/319.9; 525/97; 525/191; 525/221; 525/98; 525/222

(58) Field of Classification Search
USPC ........... 525/240, 216, 480, 242, 97, 191, 221, 525/96, 22; 524/474, 570, 394; 526/348.1; 428/515, 318.4, 319.3, 319.7, 319.9, 428/35.7
See application file for complete search history.

(56) References Cited

U.S. PATENT DOCUMENTS 3,248,179 A    4/1966  Norwood
4,185,067 A    1/1980  MacAdams et al.
(Continued)

FOREIGN PATENT DOCUMENTS

EP    0 634 421    1/1995
EP    0 794 200    9/1997
(Continued)

OTHER PUBLICATIONS

Watkins et al., Department of Energy Grant, Sep. 7, 2001, p. 25.*
(Continued)

*Primary Examiner* — Ellen S Raudenbush (57) ABSTRACT

Polymeric compositions and methods of making and using such compositions are provided. The compositions incorporate a first polymeric component that is at least one high density polyethylene and a second polymeric component that is at least one polymer including propylene-derived units having a heat of fusion of less than 75 J/g wherein the propylene-derived units have an isotactic triad fraction of about 65% to about 99%. The polymeric compositions are found to have desirable environmental stress crack resistance properties and impact resistance properties. The polymeric compositions are useful in a variety of applications such as molded containers and extruded pipes.

25 Claims, 1 Drawing Sheet

(56) References Cited

U.S. PATENT DOCUMENTS

| | | | |
|---|---|---|---|
| 4,543,399 | A | 9/1985 | Jenkins, III et al. |
| 4,577,768 | A | 3/1986 | Go et al. |
| 4,588,790 | A | 5/1986 | Jenkins, III et al. |
| 4,613,484 | A | 9/1986 | Ayres et al. |
| 5,001,205 | A | 3/1991 | Hoel |
| 5,028,670 | A | 7/1991 | Chinh et al. |
| 5,317,036 | A | 5/1994 | Brady, III et al. |
| 5,352,749 | A | 10/1994 | DeChellis et al. |
| 5,405,922 | A | 4/1995 | DeChellis et al. |
| 5,436,304 | A | 7/1995 | Griffin et al. |
| 5,453,471 | A | 9/1995 | Bernier et al. |
| 5,462,999 | A | 10/1995 | Griffin et al. |
| 5,616,661 | A | 4/1997 | Eisinger et al. |
| 5,627,242 | A | 5/1997 | Jacobsen et al. |
| 5,665,818 | A | 9/1997 | Tilston et al. |
| 5,668,228 | A | 9/1997 | Chinh et al. |
| 5,677,375 | A | 10/1997 | Rifi et al. |
| 5,693,727 | A | 12/1997 | Goode et al. |
| 5,712,352 | A | 1/1998 | Brant et al. |
| 6,362,270 | B1 * | 3/2002 | Chaudhary et al. ........... 524/515 |
| 6,547,094 | B1 | 4/2003 | Jacobs |
| 6,642,316 | B1 | 11/2003 | Datta et al. |
| 6,881,800 | B2 | 4/2005 | Friedersdorf |
| 6,960,635 | B2 | 11/2005 | Stevens et al. |
| 2003/0195299 | A1 * | 10/2003 | Stevens et al. ................ 525/240 |
| 2005/0203235 | A1 * | 9/2005 | Gong et al. ................... 524/445 |

FOREIGN PATENT DOCUMENTS

| | | |
|---|---|---|
| EP | 0 802 202 | 10/1997 |
| FR | 2313424 | 2/1977 |
| GB | 1391804 | 4/1975 |
| JP | 50039744 | 4/1975 |
| JP | 51039744 | 4/1976 |
| JP | 62059646 | 3/1987 |
| WO | WO 91/19763 | 12/1991 |
| WO | WO 96/08520 | 3/1996 |
| WO | WO 96/33227 | 10/1996 |
| WO | WO 97/22639 | 6/1997 |
| WO | WO 00/70134 | 11/2000 |
| WO | WO 02/083754 | 10/2002 |
| WO | WO 02/090393 | 11/2002 |
| WO | WO 2004/031291 | 4/2004 |
| WO | WO 2004/060994 | 7/2004 |

OTHER PUBLICATIONS

"*Discussion of the Polyethylene Pipe Cell Classifications (as per ASTM D 3350),*" Info Brief, Rinker Materials, pp. 1-2, Feb. 1992 (2009).

Elvers B., Eds et al., Ullmann's Encyclopedia of Industrial Chemistry, Plastics, Processing, vol. A20, pp. 688-696 (VCH Publishers, 1992).

Fair, R. L., "Rotational Molding," Modern Plastics Encyclopedia 1990, pp. 317-318.

J. Wiley & Sons, "Rotational Molding," Encyclopedia of Polymer Science and Engineering, vol. 14, pp. 659-670, 1971.

Wheeler et al., "Gel Permeation Chromatography/Fourier Transform Infrared Interface for Polymer Analysis," Applied Spectroscopy, vol. 47, No. 8 (1993), pp. 1128-1130.

Yu, T. C., "Impact Modification of Polypropylenes with Exact™ Plastomers," Soc. of Plastics Engineers, ANTEC, May 1994, pp. 2439-2445.

* cited by examiner

POLYMERIC COMPOSITIONS INCLUDING THEIR USES AND METHODS OF PRODUCTION

CROSS REFERENCE TO RELATED APPLICATION

This application is a 371 National Stage Application of International Application No. PCT/US2005/033047, filed Sep. 16, 2005, which claims the benefit of Provisional Application No. 60/636,500 filed Dec. 16, 2004, the disclosures of which are herein incorporated by reference in their entireties.

FIELD OF THE DISCLOSURE

The disclosure relates to polymeric compositions and methods of making and using such compositions. The compositions incorporate at least one high density polyethylene polymer and at least one polymer including propylene-derived units.

BACKGROUND INFORMATION

It is known to blend two or more polymeric materials to achieve beneficial performance characteristics in the resulting polymeric composition. One such conventional blending process is the blending of elastomeric and thermoplastic polymeric materials. For example, as described in U.S. Pat. No. 6,642,316, it is known to blend ethylene propylene based interpolymers with polypropylene so as to provide a polypropylene dispersed phase and an elastomeric continuous matrix phase. The overall blend may be elastomeric in nature. The ethylene propylene based interpolymers may be of the type described in WO 02/083754. WO 04/060994 discloses the production of elastomeric blends by blending propylene rich polymers with minor amounts of ethylene polymers to produce blends having a continuous phase of the propylene rich polymer and a dispersed phase of the ethylene polymer.

High density polyethylene polymers are widely used in a variety of molded and extruded articles such as containers and pipes. Pipes made using high density polyethylene are lightweight and can be easily assembled by fusion welding. Polyethylene pipes also have good flexibility and are corrosion free. PCT Published Applications WO/91/19763; WO 02/0903393; and WO 2004/031291 disclose polyethylene polymers and polymer blends with improved environmental stress crack resistance properties.

Other background references include WO 2000/70134.

SUMMARY OF THE DISCLOSURE

The disclosure relates to polymeric compositions and methods of making and using such compositions. The polymeric compositions are found to have beneficial environmental stress crack resistance properties and are useful and desirable for inclusion in a variety of products. In particular, in one embodiment, the polymeric compositions may exhibit an environmental stress crack resistance ($F_{100}$) of at least 24 hours. In other embodiments, the polymeric compositions may have an environmental stress crack resistances ($F_{100}$) of at least 48 hours. In still other embodiments, the polymeric compositions may exhibit environmental stress crack resistances ($F_{100}$) of at least 72 hours. The polymeric compositions may also exhibit beneficial impact resistance properties.

The polymeric compositions incorporate at least two polymeric components including a first component that is at least one high density polyethylene polymer and a second component that is at least one polymer having propylene-derived units. The at least one high density polyethylene polymer may be selected from a wide variety of high density polyethylene polymers. The at least one polymer having propylene-derived units is an elastomer having limited crystallinity resulting from a controlled disruption in isotactic propylene sequences of the polymer.

The at least one high density polyethylene polymer and the at least one polymer having propylene-derived units may be combined by any suitable methods including, melt-blending. The at least one high density polyethylene polymer and the at least one polymer having propylene-derived units may also be crosslinked though a variety of processes known in the art such as dynamic vulcanization or static vulcanization of shaped articles.

DETAILED DISCLOSURE

This disclosure relates to polymeric compositions having beneficial environmental stress crack resistance properties while exhibiting other beneficial performance properties. For example, the polymeric compositions may also exhibit beneficial impact resistance properties. The physical properties of the polymeric compositions make them suitable for use in a variety of molded product applications. Exemplary product applications are injection molded containers, extruded pipes as well as rotational and blow-molded containers, such as agricultural and chemical tanks, large containers for material handling, portable toilets, instrument and battery cases, vacuum cleaner housings, toy containers, garbage containers, milk bottles, oil bottles, water bottles, etc.

High density polyethylene polymers are favored for use in many articles because of their lightweight and the ability to be easily molded and extruded. Pipes made from high density polyethylene are also generally easy to assemble through fusion welding. The polymeric compositions described herein improve upon the general performance characteristics of high density polyethylene by blending at least one elastomeric component in high density polyethylene blends. Inclusion of the elastomeric component improves the environmental stress crack resistance of the high density polyethylene as well as the impact resistance of the high density polyethylene.

In one embodiment, the polymeric compositions described herein include at least two polymer components. The first polymer component is at least one high density polyethylene and the second polymer component is at least one polymer including propylene-derived units having a heat of fusion of less than 75 J/g with the propylene-derived units having an isotactic triad fraction of about 65% to about 99%. In another embodiment, the propylene-derived units have isotactic triad fractions of about 70% to about 98%. In still another embodiment, the propylene-derived units have isotactic triad fractions of about 75% to about 97%.

In one embodiment, the first polymeric component may represent from about 70 parts by weight to about 99.8 parts by weight per 100 parts by weight of the polymeric composition and the second polymeric component may represent from about 0.2 parts to about 30 parts by weight per 100 parts by weight of the polymeric composition. In another embodiment, the first polymeric component may represent from about 75 parts to about 99.5 parts per 100 parts by weight per 100 parts by weight of the polymeric composition and the second polymeric component may represent from about 0.5 parts to about 25 parts by weight per 100 parts by weight of the polymeric composition. In still another embodiment, the first polymeric component may represent from about 80 parts to about 99 parts by weight per 100 parts by weight of the polymeric composition and the second polymeric component may represent from about 1 part to about 20 parts by weight per 100 parts by weight of the polymeric composition. In yet another embodiment, the first polymeric component may represent at least 85 parts by weight per 100 parts by weight of the polymeric composition and the second polymeric component may represent from about 0.5 parts by weight to about 15 parts by weight per 100 parts by weight of the polymeric composition. In an additional embodiment, the first polymeric component may represent at least 90 parts by weight per 100 parts by weight of the polymeric composition and the second polymeric component may represent from about 1 part by weight to about 10 parts by weight per 100 parts by weight of the polymeric composition.

In one embodiment, the combined weights of the first polymeric component and the second polymeric component comprise from about 60 wt. % to about 100 wt. % of the polymeric composition. In another embodiment, the combined weights of the first polymeric component and the second polymeric component comprise from about 65 wt. % to about 90 wt. % of the polymeric composition. In still another embodiment, the combined weights of the first polymeric component and the second polymeric component comprise from about 70 wt. % to about 85 wt. % of the polymeric composition.

As discussed, the polymeric compositions described herein exhibit beneficial environmental stress crack resistance properties. Environmental stress crack resistance ("ESCR") is determined in accordance with ASTM D-1693. In one embodiment, the polymeric compositions exhibit an environmental stress crack resistance ($F_{100}$) of at least 24 hours. In other embodiments, the polymeric compositions exhibit an environmental stress crack resistance ($F_{100}$) of at least 30 hours. In still other embodiments, the polymeric compositions exhibit environmental stress crack resistance of at least 40 hours.

The improvement in the ESCR of the polymeric compositions described herein may be expressed as a ratio of the ESCR of the polymeric compositions to the ESCR of the neat form of the high density polyethylene incorporated in the polymeric compositions. In one embodiment, the ratio of the ESCR of the polymeric compositions to the ESCR of the neat form of the high density polyethylenes incorporated in the polymeric compositions is greater than 1.2. In a second embodiment, the ratio is from about 1.2 to about 100. In a third embodiment, the ratio is from about 1.3 to about 90.

The polymeric compositions also exhibit beneficial impact resistance properties. Impact resistance is determined by the Notched Izod Impact Test measured in accordance with ASTM D-256. In certain embodiments, the polymeric compositions described herein exhibit Room Temperature Notched Izod strength of greater than 0.033 J/m. In other embodiments, the polymeric compositions described herein exhibit a Room Temperature Notched Izod strength of greater than 0.04 J/m. In still other embodiments, the polymeric compositions described herein exhibit a Room Temperature Notched Izod strength of greater than 0.05 J/m.

The polymeric compositions also exhibit reduced flexural modulus relative to neat high density polyethylene polymers. Since maintenance of the stiffness is important in certain applications, the reduction of flexural modulus, while maintaining or improving ESCR is an important feature of these compositions. Flexural Modulus is measured in accordance with ASTM D-790. In certain embodiments, the polymeric compositions described herein exhibit a flex modulus of at least 410 MPa. In other embodiments, the polymeric compositions described herein exhibit a flex modulus of about 440 MPa to about 970 MPa. In still other embodiments, the polymeric compositions described herein exhibit a flex modulus of about 550 MPa to about 930 MPa.

The change in the flex modulus of the polymeric compositions described herein may be expressed as a ratio of the flex modulus of the polymeric compositions to the flex modulus of the neat form of the high density polyethylene incorporated in the polymeric compositions. In one embodiment, the ratio of the flex modulus of the polymeric compositions to the flex modulus of the neat form of the high density polyethylenes incorporated in the polymeric compositions is greater than 0.6. In a second embodiment, the ratio is from about 0.65 to about 0.99. In a third embodiment, the ratio is from about 0.70 to about 0.98.

In certain embodiments, the polymeric compositions described herein may include a variety of other polymeric components and additives. The various components of the polymeric compositions may be combined by any suitable method such as blending, including melt blending. Additionally, two or more of the polymeric components of the compositions may be crosslinked.

Figure 1:
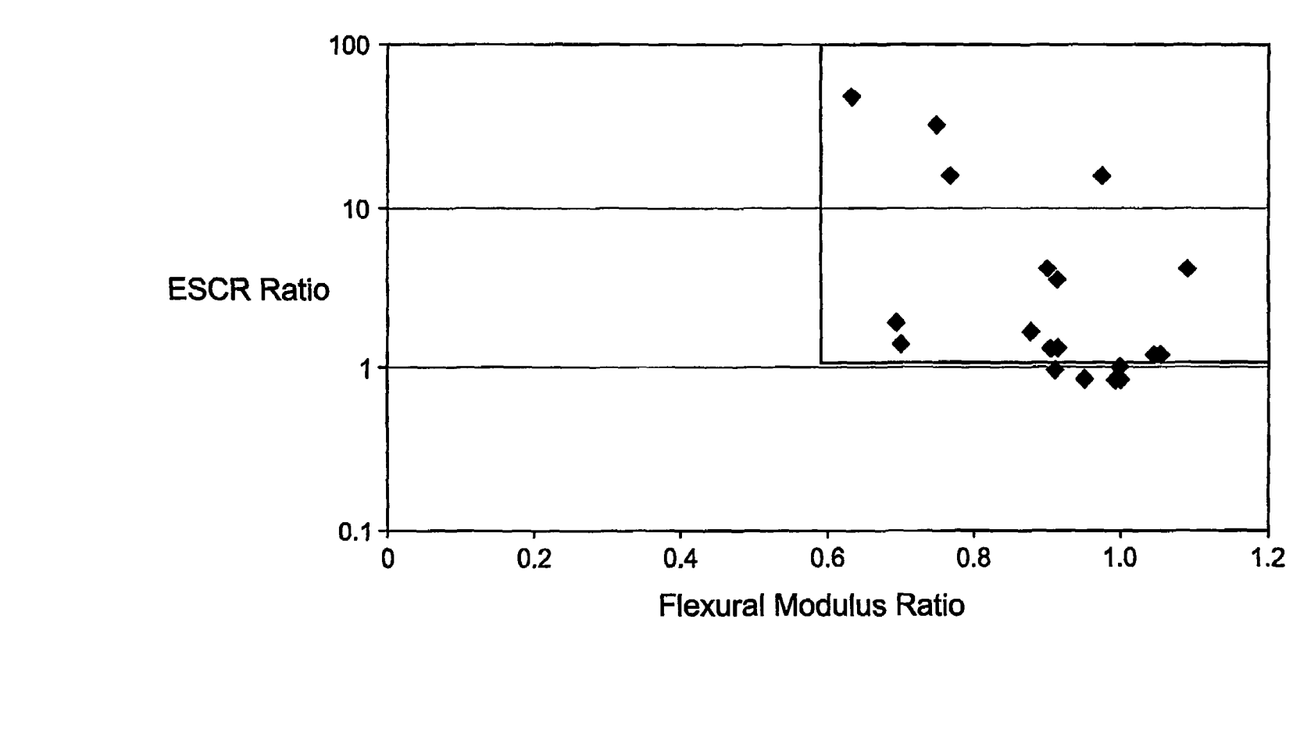
FIG. 1 provides a schematic depiction of ESCR properties and flexural modulus properties of certain embodiments of the polymeric compositions described herein.

FIG. 1 provides a schematic depiction of the ESCR properties and flexural modulus properties of certain embodiments of the polymeric compositions described herein. Attempts to improve the ESCR of conventional HDPE compositions involve the addition of lower density ethylene copolymers. However, improvement of ESCR may come at the expense of stiffness (flex modulus). The compositions and methods described herein provide both high ESCR and beneficial flex modulus properties. FIG. 1 depicts the range of these properties exhibited by certain embodiments of the inventive compositions.

Certain components of the polymeric compositions are described as follows.

High Density Polyethylene Polymeric Component ("HDPE")

The HDPE, the first polymer component, described herein, includes polymers made using a variety of catalyst systems including Ziegler-Natta, Phillips-type catalysts, chromium based catalysts, and metallocene catalyst systems which may be used with alumoxane and/or ionic activators. Processes useful for preparing such polyethylenes include gas phase, slurry, solution processes, and the like.

The HDPE is a semicrystalline polymer available in a wide range of molecular weighs as indicated by either MI or HLMI (melt index or high-load melt index) and includes an ethylene content of at least 80 mole percent based upon the total moles of the HDPE. If incorporated in the HDPE, comonomers may be selected from butene and other $C_3$ to $C_{20}$ alpha olefins. In one embodiment, the comonomers are selected from 1-butene, 4-methyl-1-pentene, 1-hexene, and 1-octene, and mixtures thereof. If included in the HDPE, in one embodiment, the comonomers will be present up to about 20 mole percent, based on the total moles of the HDPE. In another embodiment, the commoners are present at up to about 10 mole percent.

In one embodiment, the density of the HDPE is at least 0.935 g/cm$^3$ as defined by ASTM method D-1505. In another embodiment, the HDPE has a density of about 0.94 g/cm$^3$ to about 0.97 g/cm$^3$. In a third embodiment, the density of the HDPE is from about 0.945 g/cm$^3$ to about 0.965 g/cm$^3$.

In certain embodiments, the melting point of the HDPE, as measured by a differential scanning calorimeter (DSC), is from about 120° C. to about 145° C. In other embodiments, the melting point of the HDPE is from about 125° C. to about 140° C. In one embodiment, the HDPE has a melt index of from about 0.02 to about 30.0. In a second embodiment, the melt index of the HDPE is from about 0.05 to about 25.0. In a third embodiment, the melt index of the HDPE is from about 0.1 to about 20.0.

In another embodiment, the HDPE has an MI of from 0.02 to about 30 and an Mw/Mn of from about 1.5 to about 40.

Exemplary HDPE's are commercially available as Marlex TR-130 from Phillips Chemical Company, M6211 from Lyondell Petrochemicals, Co., and Dow XU 6151.302 from Dow Chemical Co., HD6706, AD 60 007, BA 53 035 from ExxonMobil Chemical, among others.

Polymeric Component Including Propylene-Derived Units (PPU)

The second polymer component is a polymer with propylene-derived units ("PPU") with crystalline regions interrupted by non-crystalline regions. The non-crystalline regions may result from regions of non-crystallizable polypropylene segments and/or the inclusion of comonomer units. The crystallinity and the melting point of the PPU are reduced compared to highly isotactic polypropylene by the introduction of errors in the insertion of propylene and/or by the presence of comonomer. The PPU melting point is 105° C. or less as determined by DSC.

In one embodiment, the PPU comprises at least 75 wt. % of propylene-derived units. In another embodiment, the PPU comprises from 75 wt. % to 95 wt. % of propylene-derived units. In still another embodiment, the PPU comprises from 80 wt. % to 90 wt. % of propylene-derived units.

In one embodiment, the PPU has a Shore A hardness of less than about 90. In another embodiment, the PPU a Shore A hardness of about 45 to about 90. In still another embodiment, the PPU has a Shore A hardness of about 55 to about 80.

In one embodiment, the PPU has an MFR of about 0.5 to about 200. In another embodiment, the PPU has an MFR of about 1 to about 100. In still another embodiment, the PPU has an MFR of about 1 to about 50.

The crystallinity of the PPU may be expressed in terms of heat of fusion. In certain embodiments, the PPU has a heat of fusion, as determined by DSC, ranging from a lower limit of 1.0 J/g, or 1.5 J/g, or 3.0 J/g, or 4.0 J/g, or 6.0 J/g, or 7.0 J/g, to an upper limit of 30 J/g, or 40 J/g, or 50 J/g, or 60 J/g, or 75 J/g. Without being bound by theory, it is believed that the PPU described herein has generally isotactic crystallizable propylene sequences, and the heats of fusion described above are thought to result from melting of these crystalline segments. In one embodiment, the PPU has a heat of fusion of less than 60 J/g. In one embodiment, the level of crystallinity of the PPU is also reflected in a lower melting point.

In one embodiment, the PPU has a weight average molecular weight ($M_w$) within the range having an upper limit of 5,000,000 g/mol, or 1,000,000 g/mol, or 500,000 g/mol, and a lower limit of 10,000 g/mol, or 15,000 g/mol, or 20,000 g/mol, or 80,000 g/mol, and a molecular weight distribution $M_w/M_n$ (MWD), sometimes referred to as a "polydispersity index" (PDI), within the range having an upper limit of 40, or 20, or 10, or 5, or 4.5, and a lower limit of 1.5, or 1.8, or 2.0.

In one embodiment, the propylene-derived units of the PPU have an isotactic triad fraction of about 65% to about 99%. In another embodiment, the propylene-derived units of the PPU have an isotactic triad fraction of about 70% to about 98%. In still another embodiment, the propylene-derived units of the PPU have an isotactic triad fraction of about 75% to about 97%.

In some embodiments, the crystallinity of the PPU is reduced by the copolymerization of propylene with limited amounts of one or more comonomers selected from: ethylene, $C_4$-$C_{20}$ alpha-olefins, and polyenes. In one embodiment, the PPU comprises at least 5 wt. % of the alpha-olefin comonomer units. In another embodiment, the PPU comprises about 10 wt. % to about 20 wt. % of the alpha-olefin comonomer units. In another embodiment, the PPU comprises from about 75 wt. % to about 95 wt. % propylene-derived units and from about 5 wt. % to about 25 wt. % of the ethylene-derived units. In still another embodiment, the PPU comprises from about 80 wt. % to about 95 wt. % propylene-derived units and from about 5 wt. % to about 20 wt. % the ethylene-derived units. In an additional embodiment, the PPU comprises at least 70 wt. % of propylene-derived units and about 5.0 wt. % to about 30.0 wt. % of ethylene-derived units.

The optional polyene units may be derived from any hydrocarbon structure having at least two unsaturated bonds wherein at least one of the unsaturated bonds may be incorporated into a polymer. For example, the optional polyene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, alkenyl norbornenes, alkylidene norbornenes, cycloalkenyl norbornenes, and cycloalkyliene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, divinyl benzene, and tetracyclo (A-11,12)-5,8-dodecene.

In one embodiment, the PPU incorporates from about 1 wt. % to about 12 wt. % of polyene-derived units, based on the combined weight of the propylene-derived units and the alpha-olefin-derived units, if any. In another embodiment, the PPU incorporates from about 1.0 wt. % to about 9.0 wt. % of polyene-derived units, based on the combined weight of the propylene-derived units and the alpha-olefin-derived units, if any. In another embodiment, the PPU incorporates from about 2.0 wt. % to about 7.0 wt. % of polyene-derived units, based on the combined weight of the propylene-derived units and the alpha-olefin-derived units, if any. In yet another embodiment, the PPU incorporates from about 3.0 wt. % to about 5.0 wt. % of polyene-derived units, based on the combined weight of the propylene-derived units and the alpha-olefin-derived units, if any.

In one embodiment, the polyene-derived units are derived from 5-ethylidene-2-norbornene. In another embodiment, the polyene-derived units are derived from 5-vinyl-2-norbornene. In still another embodiment, the polyene-derived units are derived from divinyl benzene.

The polymeric compositions described herein are not limited by any particular polymerization method for preparing the PPU of the invention, and the polymerization processes described herein are not limited by any particular type of reaction vessel.

In one embodiment, the catalyst system used to produce the PPU includes one or more transition metal compounds and one or more activators. When alumoxane or aluminum alkyl activators are used, the combined pre-catalyst-to-activator molar ratio is from 1:5000 to 10:1. When ionizing activators are used, the combined pre-catalyst-to-activator molar ratio is from 10:1 to 1:10. Multiple activators may be used, including using mixtures of alumoxanes or aluminum alkyls with ionizing activators. In other embodiments, the methods and catalyst systems disclosed in U.S. Patent Application 20040024146 published Feb. 5, 2004 may be used to produce the PPU. In still other embodiments, the PPU may be produced using catalyst systems such as the nonmetallocene, metal-centered, heteroaryl ligand catalyst systems as described in U.S. Patent Application 20030204017 published Oct. 30, 2003.

One or more reactors in series or in parallel may be used in the present invention. The catalyst component and activator may be delivered as a solution or slurry, either separately to the reactor, activated in-line just prior to the reactor, or preactivated and pumped as an activated solution or slurry to the reactor. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added either to the first reactor in the series or to both reactors with one component being added to first reaction and another component to the other reactors.

Exemplary PPU's are commercially available from ExxonMobil Chemical under the tradename Vistamaxx™ and from The Dow Chemical Company under the tradename Versify™.

For further general process condition information suitable for use in preparing the PPU's, see U.S. Pat. No. 5,001,205 and PCT publications WO 96/33227 and WO 97/22639. For further information on gas phase polymerization processes, see U.S. Pat. Nos. 4,543,399; 4,588,790; 5,028,670; 5,317,036; 5,352,749; 5,405,922; 5,436,304; 5,453,471; 5,462,999; 5,616,661; 5,627,242; 5,665,818; 5,668,228; and 5,677,375, and European publications EP-A-0 794 200; EP-A-0 802 202; and EP-B-634 421. For information relating to methods of introducing liquid catalyst systems into fluidized bed polymerizations into a particle lean zone, see U.S. Pat. No. 5,693,727. For further information on slurry polymerization processes, see U.S. Pat. Nos. 3,248,179 and 4,613,484. PCT publication WO 96/08520 and U.S. Pat. No. 5,712,352 describe a polymerization process operated in the absence of or essentially free of any scavengers, although the use of scavengers is contemplated for producing the PPU described herein.

Additional Components

As mentioned above, the polymeric compositions described herein may include polymeric and additive components in addition to the HDPE and PPU polymeric components described above. The following is a description of exemplary additional components.

Third Polymer Component (TPC)

In some embodiments, the polymeric compositions described herein may include another polymer incorporating propylene-derived units that will be referred to as a third polymer component ("TPC"). The TPC has a melting point determined by DSC of 115° C. or higher. In some embodiments, the TPC may have isotactic propylene-type crystallinity, and may be selected from: propylene homopolymers, propylene copolymers, and mixtures thereof, including mixtures of the type commonly referred to as reactor copolymers or impact copolymers. In embodiments where the TPC includes a propylene copolymer, the propylene copolymer may be a graft copolymer, block copolymer, reactor made polypropylene ethylene-propylene copolymer blend, or random copolymer.

In one embodiment, the TPC is at least 0.5 parts by weight per 100 parts by weight of the polymeric composition of a isotactic polypropylene based polymer having a melting point of at least 115° C. as determined by DSC and/or at least 0.5 parts of an ethylene interpolymer having a density of less 0.91 g/cm$^3$ In some embodiments, the amount of propylene-derived units present in the TPC is 90 wt. % or higher, or 92 wt. % or higher, or 95 wt. % or higher, or 97 wt. % or higher, or 100 wt. %, based on the total weight of the TPC. If the TPC is a reactor polypropylene ethylene-propylene copolymer blend, the total amount of ethylene in the copolymer blend is within the range of 1 wt. % to 40 wt. %. In one embodiment, the propylene-derived units of the TPC have an isotactic triad fraction of about 50% to about 99%. In another embodiment, the propylene-derived units of the TPC have an isotactic triad fraction of about 70% to about 98%. In still another embodiment, the propylene-derived units of the TPC have an isotactic triad fraction of about 80% to about 98%.

In one embodiment, the TPC includes a random copolymer of propylene and at least one comonomer selected from one or more of: ethylene and $C_4$-$C_{12}$ alpha-olefins. In certain embodiments, the amount of comonomer is within the range having an upper limit of 15 wt. %, or 13 wt. %, or 11 wt. %, or 9 wt. %, or 8 wt. %, or 6 wt. %, and a lower limit of 2 wt. %, based on the total weight of the TPC. In one embodiment, the TPC incorporates from about 2 wt. % to about 10 wt. % of the comonomer units.

In certain embodiments, the TPC has a melting point by DSC of at least 125° C., or at least 130° C., or at least 135° C. and a heat of fusion, as determined by DSC, of at least 40 J/g, or at least 50 J/g, or at least 60 J/g, or at least 70 J/g, or at least 80 J/g.

In various embodiments, the TPC has a weight average molecular weight ($M_w$) within the range having an upper limit of 5,000,000 g/mol, or 500,000 g/mol, and a lower limit of 10,000 g/mol, or 50,000 g/mol, and a molecular weight distribution $M_w/M_n$ (MWD), sometimes referred to as a "polydispersity index" (PDI), within the range having an upper limit of 40 and a lower limit of 1.5.

The TPC may be prepared by any of various methods. In one embodiment, the TPC may be a propylene homopolymer obtained by a well known process for the homopolymerization of propylene in a single stage or multiple-stage reactor. In another embodiment, the TPC may be a propylene copolymer obtained by a well known process for copolymerizing propylene and one or more comonomers in a single stage or multiple-stage reactor.

Polymerization methods for preparing the TPC include high pressure, slurry, gas, bulk, solution phase, and combinations thereof. Catalyst systems that can be used include traditional Ziegler-Natta catalysts and single-site metallocene catalyst systems. In one embodiment, the catalyst used has a high isospecificity.

Polymerization of the TPC may be carried out by a continuous or batch process and may include the use of chain transfer agents, scavengers, or other such additives well known to those skilled in the art. The TPC may also contain additives such as flow improvers, nucleators, and antioxidants which are normally added to isotactic polypropylene to improve or retain properties.

In one embodiment, the polymeric compositions described herein incorporate from about 0.5 part by weight to about 10 parts by weight of the TPC per 100 parts by weight of the polymeric composition. In another embodiment, the polymeric compositions described herein incorporate from about 0.5 parts by weight to about 10 parts by weight of the TPC per 100 parts by weight of the polymeric composition. In still embodiment, the polymeric compositions described herein incorporate from about 5 parts by weight to about 8 parts by weight of the TPC per 100 parts by weight of the polymeric composition.

Fourth Polymer Component (FPC)

Some embodiments of the polymeric compositions described herein include a fourth polymer component ("FPC") having a density of less than 0.935 g/cm$^3$. The FPC, which in some embodiments may have ethylene-type crystallinity, may be a copolymer of ethylene and a second alpha-olefin. In another embodiment, the FPC may be a polymer comprising monomer units selected from ethylene, another alpha-olefin, and a diene. In one embodiment, the level of ethylene-derived units in the FPC is 50 mol % or greater. In one embodiment, the FPC is an ethylene-octene copolymer. In another embodiment the FPC is a copolymer of ethylene, propylene, and diene, commonly referred to as "EPDM". In one embodiment, the level of propylene-derived units in the FPC is 40 mol % or greater.

In one embodiment, the polymeric compositions described herein incorporate from about 1 part by weight to about 10 parts by weight of the FPC per 100 parts by weight of the polymeric composition. In another embodiment, the polymeric compositions described herein incorporate from about 5 parts by weight to about 10 parts by weight of the FPC per 100 parts by weight of the polymeric composition. In a third embodiment, the polymeric compositions described herein incorporate from about 5 parts by weight to about 8 parts by weight of the FPC per 100 parts by weight of the polymeric composition.

Additives

The polymeric compositions describe herein may include one or more additive components in addition to the polymer components described above. Various additives may be present to enhance a specific property or may be present as a result of processing of the individual components. Additives which may be incorporated include, but are not limited to, fire retardants, antioxidants, plasticizers, pigments, vulcanizing or curative agents, vulcanizing or curative accelerators, cure retarders, processing aids, flame retardants, tackifying resins, flow improvers, and the like. Antiblocking agents, coloring agents, lubricants, mold release agents, nucleating agents, reinforcements, and fillers (including granular, fibrous, or powder-like) may also be employed. Nucleating agents and fillers may improve the rigidity of the article. The list described herein is not intended to be inclusive of all types of additives which may be employed with the present invention.

It will be appreciated that other additives may be employed to enhance properties of the composition. As is understood by those skilled in the art, the polymeric compositions may be modified to adjust the characteristics of the blend as desired.

The polymeric compositions described herein may also contain inorganic particulate fillers, which may improve the mechanical and wear properties of the compositions. The amount of inorganic filler used is typically less than 60 wt. %, or less than 50 wt. %, or less than 40 wt. %, or less than 30 wt. %, based on the total weight of the composition. The inorganic fillers include particles less than 1 mm. in diameter, rods less than 1 cm in length, and plates less than 0.2 cm$^2$ in surface area. Exemplary particulate fillers include carbon black, clays, titanium and magnesium oxides, and silica. In addition, other particulate fillers, such as calcium carbonate, zinc oxide, whiting, and magnesium oxide, can also be used. An example of a rod-like filler is glass fiber. An exemplary plate-like filler is mica. The addition of very small particulates, commonly referred to as nanocomposites, is also contemplated. The addition of the fillers may change the properties of the compositions described herein. For example, polymeric compositions including inorganic filler may have improved thermal stability and resistance to wear. The addition of white fillers may improve the temperature changes of the hydrocarbon polymers on exposure to sunlight. The addition of fillers beyond a certain level may lead to a dramatic increase in the viscosity and a corresponding decrease in processability. This threshold level is referred to as the percolation threshold. The percolation threshold is attained at different levels of addition of fillers depending on the type of filler used. Generally, the percolation threshold is attained at lower levels for fillers with a smaller size than for fillers with a larger size.

The addition of process aids, such as a mixture of fatty acid ester or calcium fatty acid soap bound on a mineral filler, to the compositions described herein may help the mixing of the composition and the injection of the composition into a mold. Other examples of process aids are low molecular weight polyethylene copolymer wax and paraffin wax. The amount of process aid used may be within the range of from 0.5 to 5 phr.

Adding antioxidants to the compositions described herein may improve the long term aging. Examples of antioxidants include, but are not limited to quinolein, e.g., trimethylhydroxyquinolein (TMQ); imidazole, e.g., zincmercapto toluyl imidazole (ZMTI); and conventional antioxidants, such as hindered phenols, lactones, and phosphites. The amount of antioxidants used may be within the range of from 0.001 to 5 phr.

In one embodiment, the polymeric compositions described herein include about 1 wt. % to about 60 wt. % of an additive selected from the group consisting of a filler, a pigment, a coloring agent, a processing oil, a plasticizer, and mixtures thereof. In another embodiment, the polymeric compositions described herein include about 5 wt. % to about 50 wt. % of an additive selected from the group consisting of a filler, a pigment, a coloring agent, a processing oil, a plasticizer, and mixtures thereof. In still another embodiment, the polymeric compositions described herein include about 10 wt. % to about 40 wt. % of an additive selected from the group consisting of a filler, a pigment, a coloring agent, a processing oil, a plasticizer, and mixtures thereof.

Blending Polymeric Components and Additives

The compositions described herein may be prepared by any procedure that provides an intimate mixture of the polymeric components. Generally, the first step of the process is mixing the polymeric components and optional additives, such as process oil, fillers, colorants, antioxidants, nucleators, and flow improvers using equipment such as, but not limited to a Carver press for melt pressing the components together, internal mixers such as a Banbury mixer or a Brabender mixer for solution or melt blending of the components, and equipment used for continuous mixing procedures including single and twin screw extruders, static mixers, impingement mixers, as well as other machines and processes designed to disperse the components in intimate contact. A complete mixture of the polymeric components is indicated by the uniformity of the morphology of the composition. Such procedures are well known.

In embodiments in which crosslinking of the polymeric components is desired, the next step is mixing a chemical curative, such as peroxides or sulfur compounds, with the intimate mixture, and then fabricating the intimate mixture including the chemical curative into the final shape of the article and raising the temperature for an extended period of time to allow the crosslinking to take place. In another embodiment, the next step is fabricating the intimate mixture into the final shape of the article, and then exposing the fabricated mixture to an external curative agent, such as high energy radiation, to allow crosslinking of the PPU.

For addition information regarding processes for preparation of polymeric blend compositions, including the crosslinking of polymeric components, see co-pending U.S. Patent Application Ser. No. 60/519,975 filed Nov. 14, 2003.

Processed Polymeric Compositions

As discussed above, the unique performance characteristics of the polymeric compositions described herein make them useful to produce a wide assortment of products. Among the materials that may be produced using the polymeric compositions described herein are injection, roto-molded and blow-molded containers and extruded pipes.

Molded Products

The polymeric compositions described above may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

Injection molding is an important process for producing moldings from thermoplastics. This significance is due to the ability of injection molding to produce complex molding geometries in a single stage with high levels of reproducibility. Plastics finishing is largely unnecessary and a high degree of automation is possible. All manner of consumer goods and commodity articles are manufactured using injection molding of polyethylene thermoplastics.

To injection mold a part, polyethylene thermoplastic pellets, granules or powders are melted and injected under pressure into a cavity of a mold where the melted resin is solidified by cooling for subsequent removal. More detailed discussion of injection molding may be found in Ulman's Encyclopedia of Industrial Chemistry, Vol. A20, Plastics Processing, pages 688-696 (VCH Publishers, 1992).

Rotational molding or rotational casting, more commonly known as rotomolding, is widely used for molding hollow articles, and can be used to mold small and large containers. To rotomold an article, a powdered, polymeric resin is charged inside a mold shell, which is then, typically, rotated on two axes and heated to cause the melting resin to adhere to the inside of the mold. After sufficient heating time, the mold is moved to a cooling chamber, and after cooling, the molded part is removed to begin another molding cycle. More detailed discussion of rotomolding may be found in Modern Plastics Encyclopedia 1990, pages 317-318, and in Encyclopedia of Polymer Science and Engineering, pages 659-670 (J. Wiley & sons, 1990).

It will be understood by those skilled in the art that the steps outlined above may be varied, depending upon the desired result. Exemplary articles made using the polymeric compositions described herein include small and large container, such as tanks utilized in chemical and agricultural industries, rotomolded containers used in packaging and material handling, portable toilets, instrument and battery cases, light globes, vacuum cleaner housing, toys, detergent or oil storage containers, corrugated pipes etc.

Experimental Evaluations

The following test methods and procedures were used in conducting experimental evaluations of various polymeric compositions as hereinafter described.

Test Methods

Comonomer content: The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, vol. 47, pp. 1128-1130.

In the particular case of propylene-ethylene copolymers containing greater than 75 wt. % propylene, the comonomer content can be measured as follows. A thin homogeneous film is pressed at a temperature of about 150° C. or greater, and mounted on a Perkin Elmer PE 1760 infrared spectrophotometer. A full spectrum of the sample from 600 $cm^{-1}$ to 4000 $cm^{-1}$ is recorded and the monomer weight percent of ethylene can be calculated according to the following equation: Ethylene wt %=82.585-111.987X+30.045$X^2$, where X is the ratio of the peak height at 1155 $cm^{-1}$ and peak height at either 722 $cm^{-1}$ or 732 $cm^{-1}$, whichever is higher.

Polyene content: The amount of polyene present in a polymer can be inferred by the quantitative measure of the amount of the pendant free olefin present in the polymer after polymerization. Several procedures such as iodine number and the determination of the olefin content by $H^1$ or $^{13}C$ nuclear magnetic resonance (NMR) have been established. In embodiments described herein where the polyene is ENB, the amount of polyene present in the polymer can be measured using ASTM D3900.

Melt Indexes were measured by ASTM method D-1238.

Flexural Modulus was measured using ASTM method D-790.

Density was measured using ASTM method D-1505.

Notched Izod Impact (J/M) was measured using ASTM method D-256.

1% Secant Modulus and Tangent Modulus were measured using ASTM method D-790.

Tensile Strength, Tensile Strain, Young's Modulus (MPa), Elongation @ Yield (%), and Elongation @ Break (%) were measured by ASTM method D-638.

Instrumented Impact was measured using a method developed by ExxonMobil. This method is described in T. C. Yu "Impact Modification of Polypropylenes with Exact Plastomers", Soc. of Plastics Engineers, ANTEC, May 1994. Multi-axial tests were performed at −30° C. and −40° C. using a Dynatup® instrumented impact tester fitted with an environmental chamber and cooled using liquid nitrogen. The specimens were conditioned for 24 hours at either −30° C. or −40° C. prior to testing. This test consists of puncturing a cylindrical test specimen (152 mm diameter, 3.2 mm thickness) with a falling weight fitted with a 20.3 mm hemispherical striker. Both the weight of the striker and the velocity with which it strikes the specimen can be adjusted. The striker normally loses about 10% of its impact velocity while passing through the sample. A minimum of 5 samples was tested for each condition. For this test method, high-speed puncture testing based on ASTM D-3763 was used to study impact behavior. This test continuously measures the applied force and time during the impact event. The electronically collected data points are next processed through a computer to provide graphic representation of both force and energy as a function of displacement. A drop-weight tester, Ceast Fractovis, was used to gather the data. It consists of three main parts: clamp assembly, plunger assembly, and IBM PC based control unit. Two parallel rigid plates with a large opening to expose the test specimen form the clamp assembly. Both the top and bottom plates are of the same dimension. The plunger assembly consists of a steel rod with a removable hemispherical tip to hold the measuring strain gauge. It is located perpendicular to and centered on the clamp hole. A control unit regulates the plunger test speed, as well as records the load and displacement data. Similar to the conventional notched Izod testing, the test geometries need to be carefully defined because they are not precisely specified in the ASTM procedure. A 20 mm diameter hemispherical striker and a 40 mm opening clamp were used for this study. The test speed was set at 4 m/sec. For sub-ambient temperature testing, test specimens were chilled in a freezer for four hours at the test temperature. They were then stored in a liquid nitrogen cooled test chamber underneath the clamp assembly for further conditioning before testing. A force-displacement graph may be generated for a ductile material. Integration of the force displacement curve, in turn, yields an energy-displacement curve. This energy is reported in the Tables below. Initially, a ductile material may behave as elastic solid in that deformation is proportional to the displacement. The initial slope of the generated graph is therefore a measure of the sample stiffness. After the elastic region, the sample starts to yield to the advancing plunger. At the yield point, the sample exerts its maximum resistance; the yield point is therefore the highest point on the force-displacement curve. Afterwards, the high speed plunger initiates a crack in the sample and starts its downward penetration of the test specimen. The sample then starts to draw to accommodate the advancing plunger. Then, the plunger punctures through the test specimen; and, finally, a small amount of energy is needed to overcome the friction between the test plunger and the plastic sample. Because of the large extent of this sample drawing, the total energy is approximately twice the yield energy. A ductility index (DI) can be defined as: DI=[(Total Energy−Yield Energy)/Yield Energy]×100.

ESCR was measured by ASTM D-1693.

Blends shown in following Examples were made by mixing all components, including the HDPE component, the PPU component, the optional amounts of other ingredients in a 30 mm ZSK® twin-screw extruder with a temperature profile of 177/182/188/193/204° C., and a screw rpm of 170. Compounding in the twin screw extruder was accomplished using an intense mixing screw element. The batch size was about 5000 gm. The blends discharged from the extruder were then pelletized and injection molded into test specimens.

Standard test specimens conforming to ASTM specifications were prepared by injection molding on a 300-ton Van Dorn press. A family mold containing various ASTM specimen cavities was used. The conditions used to mold the various samples of different Melt Indices are familiar to those skilled in the art.

Experimental evaluations of comparative polymeric compositions and polymeric compositions exemplary of those described here were conducted. Table 1 lists the polymeric components used in all of the polymeric compositions evaluated with selected properties indicated. Included among the polymeric components listed are: (1) high density polyethylene ("HDPE") and (2) polymers comprising propylene-derived units (PPU's).

TABLE I

| Sample | Commercial Designation | MI | Density | ML(1 + 4) @ 125° C. | C2 (wt. %) |
|---|---|---|---|---|---|
| HDPE1 | HD6706 | 6.5 | 0.95 | — | — |
| HDPE2 | AD 60-007 | 0.73 | 0.963 | | |
| HDPE3 | BA 53-035 | 3.5 | 0.953 | | |
| PPU1 | — | — | — | 22 | 17.5 |
| PPU2 | — | — | — | 17 | 10.1 |

Table II details various properties of comparative polymeric compositions and polymeric composites exemplary of the polymeric compositions described herein.

TABLE II

| Example | 1 | 2 | 3 | 4 | 5 | 6 | 7 |
|---|---|---|---|---|---|---|---|
| HDPE1 | 100 | 99.5 | 99 | 98 | 96 | 95 | 90 |
| HDPE2 | | | | | | | |
| PPU1 | 0 | 0.5 | 1 | 2 | 4 | 5 | 10 |
| I2 | 6.1 | 6.2 | 6.0 | 6.1 | 6.0 | 6.2 | 5.7 |
| I21 | 192.9 | 153.9 | 153.7 | 152.4 | 152.6 | | |
| I21/I2 | 31.6 | 24.8 | 25.6 | 25.0 | 25.4 | | |
| Density (g/cm$^3$) | 0.9528 | 0.9520 | 0.9522 | 0.9504 | 0.9490 | | |
| ESCR F$_{100}$ (hrs) | 8 | 8 | 8 | 24 | 24 | 120 | 120 |
| Yield Stress (MPa) | 23.09 | 22.68 | 22.39 | 22.13 | 21.37 | 20.23 | 18.58 |
| Yield Strain (%) | 9.8 | 10.3 | 10.0 | 10.1 | 10.2 | 12.4 | 12.0 |
| Break Strain (%) | 401 | 618 | >650 | >650 | >650 | >650 | >650 |
| Young's Mod (MPa) | 1403 | 1279 | 1288 | 1258 | 1269 | 1138 | 1110 |
| 1% Sec Flex Mod (MPa) | 737.7 | 723.9 | 710.16 | 703.26 | 668.79 | 641.21 | 572.26 |
| 1% tan Flex Mod (MPa) | 772.21 | 806.68 | 813.58 | 841.16 | 696.37 | 751.52 | 592.94 |
| RTNI (J/m) | .032(p) | .036(p) | .041(p) | .048(p) | .07(p) | .063(p) | NB |
| NI −29° C. (J/m) | .019(c) | | | | | .0187(c) | .021(c) |
| NI −40° C (J/m) | .02(c) | | | | | .017(c) | .014(c) |
| Instrumented Impact RT (J) | 28.45 (5D) | | | | | 29.86 (5D) | 29.75 (5D) |
| Instrumented Impact −40° C. (J) | 36.12 (5D) | | | | | 37.69 (5D) | 37.98 (5D) |

| Example | 8 | 9 | 10 | 11 | 12 |
|---|---|---|---|---|---|
| HDPE1 | 85 | 80 | | | |
| HDPE2 | | | 100 | 99.5 | 99 |
| PPU1 | 15 | 20 | 0 | 0.5 | 1 |
| I2 | 5.3 | 4.8 | 0.683 | 0.792 | 0.779 |

TABLE II-continued

| | | | | | | |
|---|---|---|---|---|---|---|
| I21 | | | | 58.08 | 61.63 | 61.28 |
| I21/I2 | | | | 85.04 | 77.82 | 78.66 |
| Density (g/cm$^3$) | | | | 0.9630 | 0.9635 | 0.9621 |
| ESCR F$_{100}$ (hrs) | 264 | 336 | | 7 | 6 | 6 |
| Yield Stress (MPa) | 16.2 | 14.96 | | 28.26 | 28.47 | 28.33 |
| Yield Strain (%) | 13.9 | 13.0 | | 8.3 | 8.6 | 8.6 |
| Break Strain (%) | >650 | >650 | | 733 | 480 | 747 |
| Young's Mod (MPa) | 915 | 810 | | 1740 | 1700 | 1658 |
| 1% Sec Flex Mod (MPa) | 489.52 | 441.26 | | 896.31 | 889.42 | 910.1 |
| 1% tan Flex Mod (MPa) | 579.16 | 489.52 | | 972.16 | 965.26 | 972.16 |
| RTNI (J/m) | NB | NB | | NB | NB | NB |
| NI −29° C. (J/m) | | | | | | |
| NI −40° C (J/m) | | | | | | |
| Instrumented Impact RT (J) | | | | | | |
| Instrumented Impact −40° C. (J) | | | | | | |

| Example | 13 | 14 | 15 | 16 | 17 | 18 | 19 |
|---|---|---|---|---|---|---|---|
| HDPE2 | 98 | 96 | | | | | |
| HDPE3 | | | 100 | 99.5 | 99 | 98 | 96 |
| PPU1 | 2 | 4 | 0 | 0.5 | 1 | 2 | 4 |
| PPU2 | | | | | | | |
| I2 | 0.809 | 0.805 | 0.027 | 0.012 | 0.019 | 0.022 | 0.02 |
| I21 | 61.12 | 63.03 | 3.65 | 2.68 | 2.94 | 3.01 | 3.05 |
| I21/I2 | 75.55 | 78.3 | 135.2 | 223.3 | 154.7 | 136.8 | 152.5 |
| Density (g/cm$^3$) | 0.9615 | 0.9590 | 0.9530 | 0.9528 | 0.9525 | 0.9515 | 0.9503 |
| ESCR F$_{100}$ (hrs) | 6 | 24 | 92 | | | 119 | 152 |
| Yield Stress (MPa) | 27.09 | 25.68 | 36.61 | 38.12 | 38.12 | 38.47 | 35.99 |
| Yield Strain (%) | 9.3 | 10.0 | 14.1 | 12.8 | 12.9 | 12.7 | 12.5 |
| Break Strain (%) | 773 | 781 | 48.9 | 38.6 | 33.5 | 28.7 | 21.0 |
| Young's Mod (MPa) | 1560 | 1452 | 1297 | 1347 | 1403 | 1323 | 1116 |
| 1% Sec Flex Mod (MPa) | 854.95 | 806.68 | 965.26 | 944.58 | 951.47 | 917 | 820.47 |
| 1% tan Flex Mod (MPa) | 923.89 | 889.42 | 1130.7 | 1110 | 1048 | 1034.2 | 992.84 |
| RTNI (J/m) | NB | NB | NB | NB | NB | NB | NB |
| NI −29° C. (J/m) | | | | | | | |
| NI −40° C. (J/m) | | | | | | | |
| Instrumented Impact RT (J) | | | | | | | |
| Instrumented Impact −40° C. (J) | | | | | | | |

| Example | 20 | 21 | 22 | 23 | 24 | 25 |
|---|---|---|---|---|---|---|
| HDPE2 | | | | | | |
| HDPE3 | 92 | 99.5 | 99 | 98 | 98 | 92 |
| PPU1 | 8 | | | | | |
| PPU2 | | 0.5 | 1 | 2 | 4 | 8 |
| I2 | 0.016 | 0.016 | 0.019 | 0.022 | 0.018 | 0.02 |
| I21 | 3.51 | 2.74 | 2.87 | 3.05 | 3.13 | 3.57 |
| I21/I2 | 219.4 | 171.2 | 151.1 | 138.6 | 173.9 | 178.5 |
| Density (g/cm$^3$) | 0.9454 | 0.9530 | 0.9529 | 0.9523 | 0.9501 | 0.9467 |
| ESCR F$_{100}$ (hrs) | 171 | | | 89 | 118 | 129 |
| Yield Stress (MPa) | 30.28 | 37.09 | 37.55 | 36.52 | 34.14 | 30.66 |
| Yield Strain (%) | 17.9 | 13.0 | 13.5 | 13.9 | 15.3 | 15.4 |
| Break Strain (%) | 69.9 | 45.3 | 48.0 | 53.4 | 47.6 | 61.8 |
| Young's Mod (MPa) | 1133 | 1529 | 1717 | 1411 | 1442 | 1146 |
| 1% Sec Flex Mod (MPa) | 696.37 | 951.47 | 930.79 | 889.42 | 854.95 | 730.84 |
| 1% tan Flex Mod (MPa) | 786 | 1082.5 | 979.05 | 985.95 | 979.1 | 758.42 |
| RTNI (J/m) | NB | NB | NB | NB | NB | NB |
| NI −29° C. (J/m) | | | | | | |
| NI −40° C. (J/m) | | | | | | |
| Instrumented Impact RT (J) | | | | | | |
| Instrumented Impact −40° C. (J) | | | | | | |

Examples 1-9 show the physical properties of HD6706 and blends with PPU1, over a range of blend compositions. The ESCR of HD6706 (Example 1) is 8 hours, in contrast, addition of 2 wt. % of PPU2 (Example 4), increases the ESCR to 24 hours, with essentially no change in the flex modulus. At the same time, the Impact Properties, as measured by the Room Temperature Notched Izod (RTNI), increases by almost 50%. Similarly, addition of only 5 wt. % of PPU1 (Example 6), increases the ESCR to 120 hours, an improvement of 1400%, impact properties improves by almost 100%, while the flex modulus decreases by only about 13%. Similarly, comparing Example 10 with Example 14, one notes that addition of only 4 wt. % of PPU1, causes the ESCR to increase by 300%, while causing a decrease in the flex modulus of only 10%. Similar results are observed in Example series 15-20 and series 21-25.

With respect to the various ranges set forth herein, any upper limit recited may, of course, be combined with any lower limit for selected sub-ranges.

All patents and publications, including priority documents and testing procedures, referred to herein are hereby incorporated by reference in their entireties.

Although the present invention and its advantages have been described in detail, it should be understood that various changes, substitutions, and alterations could be made without departing from the spirit and scope of the invention as defined by the following claims.

We claim:

1. A polymeric composition consisting essentially of:
   (i) from about 80 parts to 99.5 parts by weight per 100 parts by weight of the polymeric composition of a high density polyethylene polymer having an ethylene content of at least 80 mol % and a density of about 0.95 g/cm$^3$, wherein the high density polyethylene polymer has a melting point of from about 120° C. to about 145° C., as determined by DSC;
   (ii) from about 1 part to about 20 parts by weight per 100 parts by weight of the polymeric composition of at least one second polymer component, wherein the second polymer component consists of at least 75 wt % propylene-derived units, from about 5 to about 25 wt. % ethylene-derived units, and optionally propylene-derived units, and wherein the second polymer component has a heat of fusion of less than 75 J/g, and wherein the propylene-derived units of the second polymer component have an isotactic triad fraction of about 75% to about 99%; and
   (iii) optionally one or more additives selected from the group consisting of fire retardants, antioxidants, plasticizers, pigments, vulcanizing accelerators, curative accelerators, cure retarders, processing aids, processing oils, flame retardants, tackifying resins, flow improvers, antiblocking agents, coloring agents, lubricants, mold release agents, nucleating agents, reinforcements, fillers, and mixtures thereof;
   wherein the polymeric composition and the high density polyethylene polymer each have an environmental stress crack resistance ($F_{100}$) of at least 24 hours determined according to ASTM D-1693; and a flex modulus determined according to ASTM D-790 of at least 410 MPa; and
   wherein the ratio of $F_{100}$ of the polymeric composition to the $F_{100}$ of the high density polyethylene polymer is at least 1.2.

2. The polymeric composition of claim 1, wherein the high density polyethylene polymer has a melt index of 0.02 to about 30 and an Mw/Mn of from 1.5 to about 40.

3. The polymer composition of claim 1 wherein the ratio of the flexural modulus of the polymeric composition to the flex modulus of the high density polyethylene is greater than 0.6.

4. The composition of claim 1 wherein the combined weights of the high density polyethylene and the second polymer component are from about 60 wt. % to about 100 wt. % of the polymeric composition.

5. The polymeric composition of claim 1 wherein the polymeric composition contains about 1 part to about 40 parts based upon 100 parts of the polymeric composition of an additive selected from the group consisting of a filler, a pigment, a coloring agent, a processing oil, a plasticizer, and mixtures thereof.

6. The polymeric composition of claim 1 wherein the second polymer component contains about 10 wt. % to about 20 wt. % of ethylene-derived units.

7. The polymeric composition of claim 1 wherein the polymeric composition has a flex modulus of about 440 MPa to about 970 MPa.

8. The polymeric composition of claim 1 wherein the ratio of the flexural modulus of the polymeric composition to the flex modulus of the high density polyethylene is greater than 0.6 and wherein the polymeric composition contains at least 90 parts by weight of the high density polyethylene per 100 parts by weight of the polymeric composition and about 1 part by weight to about 10 parts by weight of the second polymer component per 100 parts by weight of the polymeric composition.

9. The polymeric composition of claim 1 wherein the second polymer component contains polyene-derived units in an amount within the range of from about 0.3 wt. % to about 3 wt. %, based on the combined weight of the propylene-derived units and the ethylene-derived units.

10. The polymeric composition of claim 9 wherein the polyene-derived units are derived from 5-ethylidene-2-norbornene.

11. The polymeric composition of claim 9 wherein the polyene-derived units are derived from 5-vinyl-2-norbornene.

12. A container comprised of a polymeric composition consisting essentially of:
   (i) about 80 parts to 99.5 parts by weight per 100 parts by weight of the polymeric composition of a high density polyethylene polymer having an ethylene content of at least 80 mol %, wherein the high density polyethylene polymer has a melting point from about 120° C. to about 145° C., as determined by DSC;
   (ii) about 1 part to about 20 parts by weight per 100 parts by weight of the polymeric composition of a second polymer component, wherein the second polymer component consists of at least 75 wt. % propylene-derived units, from about 5 to about 25 wt. % ethylene-derived units and, optionally, propylene-derived units, and wherein the second polymer component has heat of fusion of less than 75 J/g and wherein the propylene-derived units of the second polymer component have an isotactic triad fraction of about 75% to about 99%; and
   (iii) optionally one or more additives selected from the group consisting of fire retardants, antioxidants, plasticizers, pigments, vulcanizing accelerators, curative accelerators, cure retarders, processing aids, processing oils, flame retardants, tackifying resins, flow improvers, antiblocking agents, coloring agents, lubricants, mold release agents, nucleating agents, reinforcements, fillers, and mixtures thereof;
   wherein the polymeric composition and the high density polyethylene polymer each have an environmental stress crack resistance ($F_{100}$) of at least 24 hours determined according to ASTM D-1693; and a flex modulus determined according to ASTM D-790 of at least 410 MPa; and
   wherein the ratio of $F_{100}$ of the polymeric composition to the $F_{100}$ of the high density polyethylene polymer is at least 1.2.

13. The container of claim 12 wherein the polymeric composition contains at least 90 parts by weight of the high density polyethylene per 100 parts by weight of the polymeric composition and about 1 parts by weight to about 10 parts by weight of the second polymer component per 100 parts by weight of the polymeric composition.

14. The container of claim 13 wherein the second polymer component contains from about 80 wt. % to about 95 wt. % propylene-derived units and from about 5 wt. % to about 20 wt. % ethylene-derived units.

15. The container of claim 12 wherein the ratio of the flex modulus of the polymeric composition to the flex modulus of the high density polyethylene is greater than 0.6 and wherein the polymeric composition has a flex modulus of about 440 MPa to about 970 MPa.

16. An extruded article comprised of a polymeric composition consisting essentially of:

a. from about 80 parts to 99.5 parts per 100 parts of the polymeric composition of a high density polyethylene polymer having an ethylene content of at least 80 mol %, wherein the high density polyethylene polymer has a melting point from about 120° C. to about 145° C., as determined by DSC;

b. from about 1 part to about 30 parts per 100 parts of the polymeric composition of a second polymer component, wherein the second polymer component consists of at least 75 wt. % propylene-derived units, from about 5 to about 25 wt. % ethylene-derived units, and, optionally, propylene-derived units, and wherein the second polymer component has a heat of fusion of less than 75 J/g and wherein the propylene-derived units of the second polymer component have an isotactic triad fraction of about 65% to about 99%; and c. optionally one or more additives selected from the group consisting of fire retardants, antioxidants, plasticizers, pigments, vulcanizing accelerators, curative accelerators, cure retarders, processing aids, processing oils, flame retardants, tackifying resins, flow improvers, antiblocking agents, coloring agents, lubricants, mold release agents, nucleating agents, reinforcements, fillers, and mixtures thereof;

wherein the polymeric composition and the high density polyethylene polymer each have an environmental stress crack resistance ($F_{100}$) of at least 24 hours determined according to ASTM D-1693; and a flex modulus determined according to ASTM D-790 of at least 410 MPa; and wherein the ratio of $F_{100}$ of the polymeric composition to the $F_{100}$ of the high density polyethylene polymer is at least 1.2.

17. The extruded article of claim 16 wherein the polymeric composition contains about 80 parts by weight to about 99 parts by weight of the high density polyethylene per 100 parts by weight of the polymeric composition and about 1 part by weight to about 25 parts by weight of the second polymer component per 100 parts by weight of the polymeric composition.

18. The extruded article of claim 16 wherein the ratio of the flex modulus of the polymeric composition to the flex modulus of the high density polyethylene is greater than 0.6 and wherein the polymeric composition contains at least 90 parts by weight of the high density polyethylene per 100 parts by weight of the polymeric composition and about 1 parts by weight to about 10 parts by weight of the second polymer component per 100 parts by weight of the polymeric composition.

19. The extruded article of claim 16 wherein the extruded article is a pipe segment and wherein the second polymer component contains from about 75 wt. % to about 95 wt. % propylene-derived units and from about 5 wt. % to about 25 wt. % ethylene-derived units, and wherein the polymeric composition has a flex modulus of about 440 MPa to about 970 MPa.

20. Composition according to claim 1 in which the second polymer component consists of from 75 wt. % to 95 wt. % propylene-derived units and from 5 wt. % to 25 wt. % ethylene-derived units.

21. Composition according to claim 1 in which the polymeric composition contains at least 90 parts by weight of the high density polyethylene per 100 parts by weight of the polymeric composition and 1 parts by weight to 10 parts by weight of the second polymer component per 100 parts by weight of the polymeric composition.

22. Composition according to claim 1 in which the polymeric composition has a flex modulus of 440 MPa to 970 MPa.

23. A container comprised of a polymeric composition according to claim 1.

24. An extruded article comprised of a polymeric composition according to claim 1.

25. An extruded article comprising;
a polymeric composition consisting essentially of:
(a) from about 80 wt. % to about 99.5 wt. % of a high density polyethylene polymer having an MI of from 0.02 to 30, an Mw/Mn of from 1.5 to 40, and a density of 0.95 g/cm³;
(b) from about 1 to about 30 wt. % of a propylene-based polymer consisting of:
(i) from about 75 wt. % to about 95 wt. % propylene-derived units, and
(ii) from about 5 wt. % to about 25 wt. % ethylene-derived units,
wherein the propylene-based polymer has a heat of fusion of less than 75 J/g, an isotactic triad fraction of about 75% to about 99%; and
(c) optionally one or more additives selected from the group consisting of fire retardants, antioxidants, plasticizers, pigments, vulcanizing accelerators, curative accelerators, cure retarders, processing aids, processing oils, flame retardants, tackifying resins, flow improvers, antiblocking agents, coloring agents, lubricants, mold release agents, nucleating agents, reinforcements, fillers, and mixtures thereof;
wherein the extruded article has a flex modulus of at least 410 MPa, and an environmental stress crack resistance ($F_{100}$) of at least 24 hours and
wherein the ratio of $F_{100}$ of the polymeric composition to the $F_{100}$ of the high density polyethylene polymer is at least 1.2.

* * * * *